(12) United States Patent
Huang et al.

(10) Patent No.: US 10,685,230 B2
(45) Date of Patent: Jun. 16, 2020

(54) METHOD OF TOP-OF-ATMOSPHERE REFLECTANCE-BASED SPATIOTEMPORAL IMAGE FUSION USING AEROSOL OPTICAL DEPTH

(71) Applicant: National Central University, Taoyuan (TW)

(72) Inventors: Chih-Yuan Huang, Taoyuan (TW); Hsuan-Chi Ho, Hsinchu (TW); Tang-Huang Lin, Taoyuan (TW)

(73) Assignee: NATIONAL CENTRAL UNIVERSITY, Taoyuan (TW)

( * ) Notice: Subject to any disclaimer, the term of this patent is extended or adjusted under 35 U.S.C. 154(b) by 148 days.

(21) Appl. No.: 16/123,420

(22) Filed: Sep. 6, 2018

(65) Prior Publication Data

US 2020/0082151 A1    Mar. 12, 2020

(51) Int. Cl.
| | |
|---|---|
| G06K 9/00 | (2006.01) |
| G06T 5/00 | (2006.01) |
| G06T 5/50 | (2006.01) |
| G06K 9/46 | (2006.01) |
| G06K 9/62 | (2006.01) |

(52) U.S. Cl.
CPC ......... *G06K 9/0063* (2013.01); *G06K 9/4642* (2013.01); *G06K 9/6215* (2013.01); *G06T 5/002* (2013.01); *G06T 5/50* (2013.01); *G06K 2009/00644* (2013.01); *G06K 2009/4657* (2013.01); *G06T 2207/10024* (2013.01); *G06T 2207/10036* (2013.01); *G06T 2207/20221* (2013.01); *G06T 2207/30181* (2013.01)

(58) Field of Classification Search
None
See application file for complete search history.

(56) References Cited

U.S. PATENT DOCUMENTS

| | | | | |
|---|---|---|---|---|
| 8,094,960 B2 * | 1/2012 | Riley | ................. | G06K 9/0063 382/191 |
| 8,737,733 B1 * | 5/2014 | Padwick | ................. | G06T 5/003 382/167 |
| 9,342,760 B1 * | 5/2016 | Deskevich | ............. | G06T 5/003 |
| 9,514,386 B2 * | 12/2016 | Scott | ................... | G06K 9/0063 |
| 9,824,276 B2 * | 11/2017 | Sant | ................... | G06K 9/00657 |
| 2006/0023948 A1 * | 2/2006 | Palmadesso | ............. | G01J 3/28 382/191 |

(Continued)

*Primary Examiner* — Anand P Bhatnagar
(74) *Attorney, Agent, or Firm* — Jackson IPG PLLC; Demian K. Jackson

(57) ABSTRACT

A fusion method is provided to obtain a spatiotemporal image. The present invention is based on a conventional model—a spatial and temporal adaptive reflectance fusion model (STARFM). In the present invention, top-of-atmosphere (TOA) reflectance is kept in image fusion. Furthermore, Himawari-8, a geostationary satellite having a very high temporal resolution (10 minutes), is used. The present invention uses similar spectral bands as whose used for high-spatial-resolution image in satellites like Landsat-8 and SPOT-6. The present invention combines a high spatial-resolution image with a high temporal-resolution image obtained from Himawari-8. Thus, a TOA-reflectance-based spatial-temporal image fusion method (TOA-STFM) is proposed for generating an image having high spatiotemporal resolution. The present invention can be applied for air quality monitoring.

5 Claims, 1 Drawing Sheet

(56) References Cited

U.S. PATENT DOCUMENTS

| | | | |
|---|---|---|---|
| 2011/0037997 A1* | 2/2011 | Karszes | B44F 1/10 |
| | | | 358/1.15 |
| 2013/0250104 A1* | 9/2013 | Williams | G06T 3/4061 |
| | | | 348/144 |
| 2013/0336540 A1* | 12/2013 | Zhang | G06T 7/40 |
| | | | 382/108 |
| 2017/0251134 A1* | 8/2017 | Zhang | G01J 3/28 |
| 2019/0286905 A1* | 9/2019 | Ritter | G06T 7/11 |
| 2020/0034949 A1* | 1/2020 | van Niekerk | G06T 3/4038 |
| 2020/0074605 A1* | 3/2020 | Goyal | G06T 5/005 |

* cited by examiner

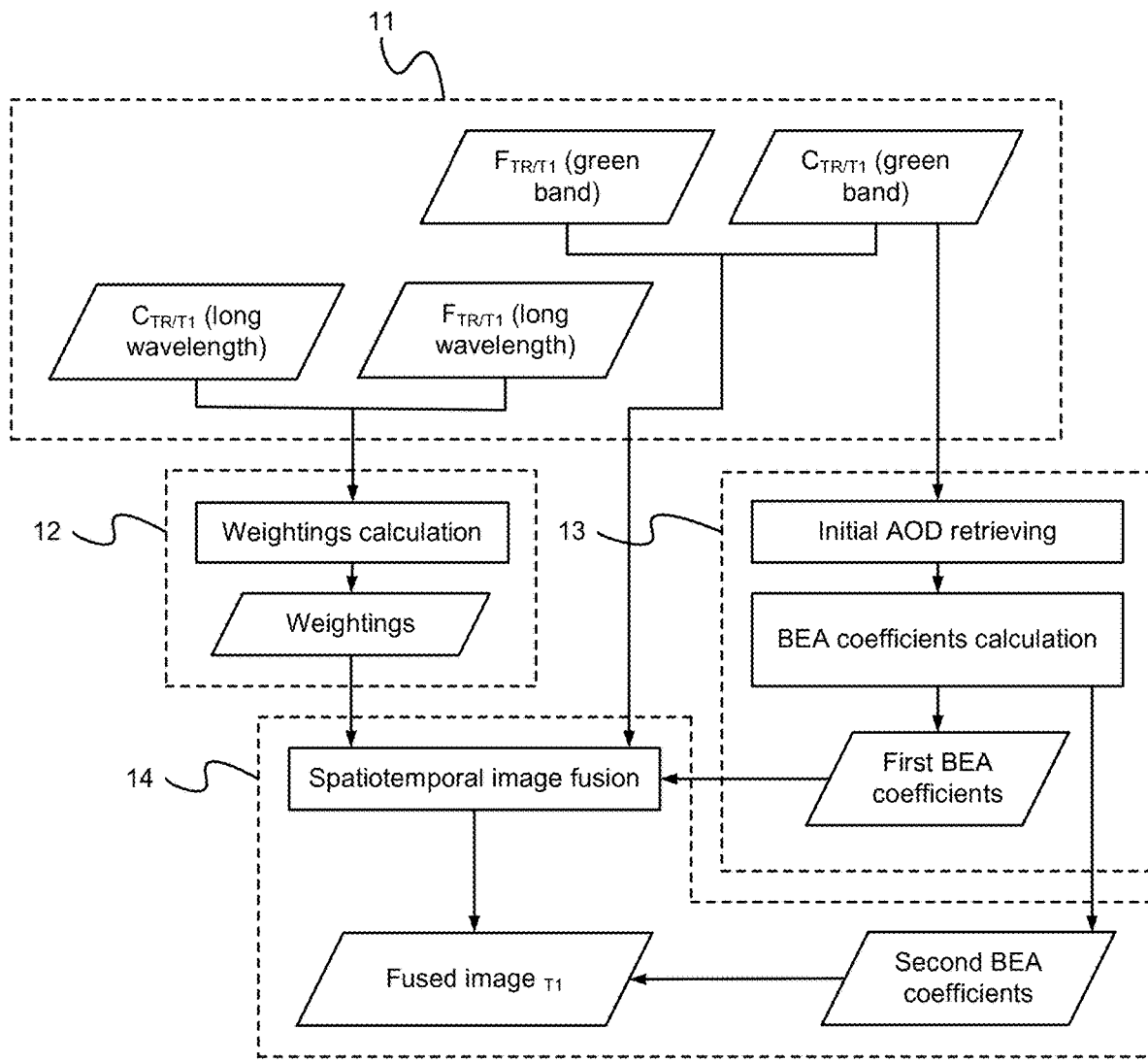

METHOD OF TOP-OF-ATMOSPHERE REFLECTANCE-BASED SPATIOTEMPORAL IMAGE FUSION USING AEROSOL OPTICAL DEPTH

TECHNICAL FIELD OF THE INVENTION

The present invention relates to spatiotemporal image fusion; more particularly, to using aerosol optical depth (AOD) on fusing high spatial-resolution images and high temporal-resolution images, where geostationary satellite images from Himawari-8 are fused with high spatial-resolution satellite images to provide a high spatiotemporal image per 10 minutes for air quality monitoring.

DESCRIPTION OF THE RELATED ARTS

Earth remote-sensing satellites provide periodic observations. Many studies turn data of periodic observation images into information to be applied in analyses in various fields, such as land cover analysis, weather analysis, etc. The images obtained by the remote sensors mounted on satellites have four categories of resolution: spatial resolution, temporal resolution, spectral resolution, and radiation resolution. Therein, the spatial resolution is the corresponding surface size of a pixel; the temporal resolution is the time cycle of an image taken by the satellite at the same place; the spectral resolution is the range of the electromagnetic spectrum detected by the sensor; and the radiation resolution is the energy of the surface radiation radiated into the sensor, all of which are quantized into gray scale to be shown in images. However, the remote sensor mounted on a single satellite does not provide multiple high resolutions simultaneously. For example, WorldView-3 satellite provides a spatial resolution of 30 centimeters, yet a temporal resolution of 4.5 days. Himawari-8 satellite emitted by Japan provides a 10-minute resolution, yet a spatial resolution of 500 meters.

In telemetry applications, some of them require image information of high spatial and temporal resolution, such as air pollution monitoring. As urban is being developed and industrialized, air pollution is worsening. Air quality monitoring becomes an important issue. Many researches apply satellite images for large-scale air quality monitoring and analysis. However, air quality has a feature of local dynamic change. The existing single satellite cannot provide images having both high spatial and high temporal resolutions. Some researchers therefore propose methods to integrate satellite images for acquiring high spatial and high temporal resolutions. All current available spatial and temporal image fusion technologies, such as Spatial Temporal Adaptive Reflectance Fusion Model (STARFM), Spatial Temporal Adaptive Algorithm for mapping Reflectance CHange (STAARCH), Enhanced Spatial and Temporal Adaptive Reflectance Fusion Model (ESTARFM), Spatial and Temporal Data Fusion Model (STDFM) and Enhanced Spatial and Temporal Data Fusion Model (ESTDFM), use surface reflectance for fusion to predict a high spatial-resolution image containing the surface reflectance. The fused image can only be applied to related land-cover analysis applications only, but not to any atmosphere-related application.

Moreover, past researches mostly integrated Landsat satellite images with MODerate-resolution Imaging Spectroradiometer (MODIS) satellite images to provide images having a high temporal resolution (30 m) and a high spatial resolution (1-2 days). However, a 1-2-day temporal resolution is insufficient to provide multi-sequential information for atmospheric applications, such as air quality monitoring.

In general, existing spatiotemporal image fusion technologies cannot support atmosphere-related applications, and most of them fuse Landsat satellite images with MODIS satellite images. The spatial resolution of the fused image is insufficient to be used in air quality monitoring. Hence, the prior arts do not fulfill all users' requests on actual use.

SUMMARY OF THE INVENTION

The main purpose of the present invention is to process spatial and temporal image fusion related to AOD for providing large-scale and multi-sequential atmospheric features on air quality monitoring.

Another purpose of the present invention is to predict a high spatial-resolution image by calculating weightings with a long-wavelength image for avoiding time-consuming atmospheric correction and adding coefficients for blurring effect adjustment (BEA).

Another purpose of the present invention is to provide accurate and stable large-scale information for areas having no air-quality monitoring stations and effectively reduce the number of the stations for monitoring air quality while achieving benefits of low cost and high accuracy.

Another purpose of the present invention is to provide a highly efficient flow for meeting application requirement of high temporal urgency on image fusion.

To achieve the above purposes, the present invention is a method of top-of-atmosphere (TOA) reflectance-based spatiotemporal image fusion using AOD, comprising steps of (a) preparation, (b) weightings calculation, (c) blurring-effect pretreatment and (d) blurring-effect posttreatment, where, in step (a), a first high spatial-resolution image ($F_{TR}$) and a first low spatial-resolution image ($C_{TR}$) at a reference time TR and a second high spatial-resolution image ($F_{T1}$) and a second low spatial-resolution image ($C_{T1}$) at a prediction time T1 are obtained; and land cover types are determined by green band of $F_{TR}$ and brightness adjustment of $C_{T1}$ are processed by being related to $C_{TR}$; where, in step (b), weightings of image fusion are calculated with long-wavelength band of $C_{TR}$ and $F_{TR}$; where, in step (c), an initial aerosol optical depth (AOD) value is obtained through a contrast method from green band of $C_{T1}$ to obtain a corresponding regression line of high spatial-resolution image; and first blurring effect adjustment (BEA) coefficients prepared to enhance blurring effect of a fused image before processing image fusion are calculated by fitting the regression line of high spatial-resolution image; where, in step (d), image fusion is processed with the weightings and the first BEA coefficients to obtain the fused image at first; and blurring effect of the fused image is then directly adjusted to obtain a TOA reflectance with second BEA coefficients calculated by fitting the regression line of high spatial-resolution image; and where the fused image has a high spatial resolution and a high temporal resolution and provides large-scale information to estimate air quality.

BRIEF DESCRIPTION OF THE DRAWINGS

The present invention will be better understood from the following detailed description of the preferred embodiment according to the present invention, taken in conjunction with the accompanying drawing, in which FIG. 1 is the flow view showing the preferred embodiment according to the present invention.

DESCRIPTION OF THE PREFERRED EMBODIMENT

The following description of the preferred embodiment is provided to understand the features and the structures of the present invention.

Please refer to FIG. 1, which is a flow view showing a preferred embodiment according to the present invention. As shown in the figure, the present invention uses top-of-atmosphere (TOA) reflectance to process image fusion and a TOA-reflectance-based spatiotemporal image fusion method (TOA-STFM) is proposed based on spatial and temporal adaptive reflectance fusion model (STARFM). The present invention generates a fused image of high spatial resolution and high temporal resolution for air-quality monitoring. The TOA reflectance is mainly fused through two methods: At first, a long wavelength image is used to determine land cover type for calculating weightings. Then, different blurring effect behaviors under different spatial resolutions during image fusion are considered for adjustment.

Regarding the weightings, STARFM finds a surface reflectance difference between a high spatial-resolution image ($F_{TR}$) and a low spatial-resolution image ($C_{TR}$) at a reference time TR to predict a surface reflectance ($F(x_{w/2}, y_{w/2}, T1)$) of a high spatial-resolution image ($F_{T1}$) at a prediction time T1 by using a low spatial-resolution image ($C_{T1}$) at the T1 time through Formula 1 as follows:

$$F(x_{w/2}, y_{w/2}, T1) = \sum_i^w \sum_j^w W_{ij} \times (C(x_i, y_j, T1) + F(x_i, y_j, TR) - C(x_i, y_j, TR)) \quad (1),$$

where F and C are surface reflectance values of $F_{TR}$ and $F_{T1}$ as well as $C_{TR}$ and $C_{T1}$, respectively; $x_{w/2}, y_{w/2}$ is a center pixel of a search window; $x_i, y_j$ is one of the neighboring pixels of the center pixel; and $W_{ij}$ is the weighting of the one of the neighboring pixels. However, using only one pixel to predict image may be easily affected by noise, and, moreover, a low spatial-resolution image may contain a number of land cover types. Therefore, STARFM adds the information of the neighboring pixels. $W_{ij}$ is a combined weighting of a spatial weighting, a temporal weighting, and a weighting of a distance between the center pixel and the one of the neighboring pixels. However, STARFM is primarily designed for predicting land cover changes having the influence of atmospheric composition kept in the fused image, while TOA reflectance is used in the present invention instead. Here, if TOA reflectance is directly applied in the existing image fusion method, the weightings may be wrong due to the atmospheric influence. Besides, to avoid time-consuming atmospheric correction, the present invention directly uses long spectral band (here, short-wave infrared band (SWIR)) to calculate the weightings because the longer wavelength band has lower atmospheric influence. Furthermore, regarding the TOA reflectance at the T1 time, the original green-band TOA reflectance obtained through Formula 1 is applied.

Concerning blurring effect adjustment (BEA), by applying green-band TOA reflectance in image fusion, the atmospheric features from $C_{T1}$ is kept. However, atmospheric features may behave differently in images having different spatial-resolutions. The main source of high spatial-resolution fused image at the T1 time is $C_{T1}$ during spatial image fusion. If $C_{T1}$ is directly applied to predict the changes of atmospheric features of $F_{T1}$, errors may be big. Therefore, image fusion should consider the behaviors of atmospheric features under different spatial resolutions. The present invention proposes the spatiotemporal image fusion method with a main idea of BEA where the aerosol optical depth (AOD) of $C_{T1}$ is found to fit the blurring effect of $F_{T1}$. At first, blurring-effect behaviors are analyzed with high resolution images and the differences thereof are found in the images having different spatial resolutions. Therefore, the BEA is divided into two parts in the present invention. The first part (named as A1) is blurring-effect pretreatment. The corresponding blurring-effect relationship between a low spatial-resolution image and a high spatial-resolution image is found to enhance blurring effect. The second part (named as A2) is a blurring-effect posttreatment. After image fusion, blurring effect is directly adjusted by fitting regression line to process TOA reflectance. The following Formula 2 and Formula 3 are used, respectively:

$$F(x_{w/2}, y_{w/2}, T1) = \sum_i^w \sum_j^w W_{ij} \times \left(F(x_i, y_j, TR) + \frac{S_{Fine} - 1}{S_{Fused} - 1} \times \right. \quad (2)$$
$$\left. ((C(x_i, y_j, T1) - C(x_i, y_j, TR)) - \text{Offset}_{Fused}) + \text{Offset}_{Fine}\right)$$

$$F(x_{w/2}, y_{w/2}, T1) = \frac{S_{Fine}}{S_{Fused}} \times \quad (3)$$
$$\left(\left(\sum_i^w \sum_j^w W_{ij} \times (F(x_i, y_j, TR) + C(x_i, y_j, T1) - C(x_i, y_j, TR))\right) - \right.$$
$$\left. \text{Offset}_{Fused}\right) + \text{Offset}_{Fine},$$

where F and C are reflectance values of the high spatial-resolution images ($F_{TR}, F_{T1}$) and the low spatial-resolution images ($C_{TR}, C_{T1}$), respectively; w is a size of a search window finding neighboring pixels having a similar spectrum; $x_{w/2}, y_{w/2}$ is a center pixel of the search window; $x_i, y_j$ is one of the neighboring pixels of the center pixel; $W_{ij}$ is the weighting of the one of the neighboring pixels; $S_{Fused}$ and $S_{Fine}$ are slope values of a regression line of a fused image and a corresponding regression line of high spatial-resolution image, respectively; and $\text{Offset}_{Fused}$ and $\text{Offset}_{Fine}$ are offset values of the regression line of the fused image and the regression line of high spatial-resolution image, respectively.

On using, the present invention comprises the following steps:

(a) Preparation 11: The high and low spatial-resolution images at the TR time and the high and low spatial-resolution images at the T1 time are inputted; land cover types are determined by green band of the high spatial-resolution image at the TR time; and brightness adjustment of the second low spatial-resolution image are adjusted by being related to the low spatial-resolution image at the TR time.

(b) Weightings calculation 12: Weightings of image fusion are calculated with long-wavelength band of the high and low spatial-resolution images at the TR time.

(c) Blurring-effect pretreatment 13: An initial aerosol optical depth (AOD) value is retrieved through a contrast method from green band of the low spatial-resolution image at the T1 time to obtain a corresponding regression line of high spatial-resolution image; and first BEA coefficients prepared to enhance blurring effect of a fused image before processing image fusion are calculated by fitting the regression line of high spatial-resolution image.

(d) Blurring-effect posttreatment 13: Image fusion is processed with the weightings and the first BEA coefficients to obtain the fused image at first; and blurring effect of the fused image is then directly adjusted to obtain a TOA reflectance with second BEA coefficients calculated by fitting the regression line of high spatial-resolution image. Thus, a novel method of TOA-reflectance-based spatiotemporal image fusion using AOD is obtained.

An AOD value of the fused image obtained after fitting the regression line of high spatial-resolution image can be retrieved to be examined with an observation image. The fused image has a high spatial resolution and a high temporal resolution and provides large-scale information for estimating air quality.

The present invention uses the contrast method to retrieve the AOD value, which method mainly compares the reference image and the prediction image to obtain a contrast ratio. The contrast method is a dispersion coefficient method (DCM) for retrieving the AOD value from the image. The DCM uses a window having a specific size to calculate a standard deviation between the prediction image and the reference image, where the reference image having an AOD value smaller than 0.1. Then, the AOD value is then estimated with the standard deviation. The present invention can process examination with an in-situ observation image obtained from AErosol RObotic NETwork (AERONET). To determine an appropriate size of the search window, the AERONET ground-based station is selected as the center of the search window, where the search window for the reference image has a high contrast ratio owing to high-reflectance and low-reflectance land cover types.

Based on STARFM, the present invention proposes TOA-STFM, which uses the TOA value for image fusion to keep atmospheric information. Since the meteorological satellite Himawari-8 has an extra high temporal resolution (10 minutes) and uses similar bands as Landsat-8 and SPOT-6, the present invention uses TOA-STFM to fuses the high spatial-resolution images obtained from Landsat-8 and SPOT-6 and the extra high temporal-resolution images obtained from Himawri-8 for generating images having high spatial resolution and high temporal resolution to be applied for air quality monitoring. The result is examined. A first examination is done with an actual observation image. A second examination retrieves the AOD value of the fused image to be compared with the in-situ observation image obtained from AERONET. Found by the first examination, as being compared with STARFM which directly fuses the TOA reflectance, TOA-STFM significantly retains better image details while their reflectance difference has a small absolute value. As the second examination shows, the AOD values retrieved through STARFM and TOA-STFM are both more stable than that of the original Himawari-8 image with even more better accuracy. Besides, the second examination also shows that, after keeping the atmospheric information, TOA-STFM proposed in the present invention can be used to retrieve more precise AOD value than STARFM. With Landsat-8 images obtained during 7 days and SPOT-6 images obtained during 3 days, TOA-STFM obtains best results for 8 days and obtains errors of daily AOD values less than 15% for 6 days.

Overall, the present invention has the following contributions:

A. TOA-STFM is proposed to process spatial and temporal image fusion with TOA reflectance, which can provide images having high spatial and temporal resolutions for related atmospheric remote-sensing applications.

B. The present invention examines and proves the fusion of Himawari-8 images for further providing dynamic environmental monitoring with high temporal resolution.

C. The present invention examines retrieved AOD value. As comparing to STARFM and the original Himawari-8 images, TOA-STFM can obtain stable and highly accurate retrieving result. It means that the present invention effectively keeps TOA reflectance for dynamic atmospheric environmental monitoring applications.

Accordingly, bases on STARFM, the present invention proposes TOA-STFM for spatial and temporal image fusion especially with TOA reflectance. Furthermore, the geostationary satellite Himawari-8 has a high temporal resolution (10 minutes), and uses similar bands as the high spatial-resolution images obtained from satellites like Landsat-8 and SPOT-6. The present invention combines the TOA reflectance of Himawari-8 geostationary satellite images and high spatial-resolution satellite images for keeping atmospheric features. A high spatial-resolution satellite fused image is provided per 10 minutes for air quality monitoring. At the same time, different blurring-effect behaviors under different spatial resolutions are taken into consideration in the spatial and temporal image fusion. By using the multi-sequential images fused according to the present invention, large-scale dynamic air-quality-change monitoring can be processed with two advantages: Firstly, for an area having no air-quality monitoring station, accurate and stable large-scale information is provided. Secondly, the number of the stations monitoring air quality of the area may be reduced while achieving the benefits of low cost and high accuracy.

The method proposed in the present invention is different from existing spatiotemporal image fusion methods in the followings:

1. Improvement: The existing spatial and temporal images are primarily designed to be applied in land cover analysis applications and cannot support atmospheric applications. However, atmospheric applications like air pollution, weather disasters, etc. require high-resolution and large-scale information. Therefore, spatiotemporal fusion technology for satellite image is important for acquiring image having both high spatial resolution and high temporal resolution. The present invention applies for air quality monitoring now, yet can be used in other atmospheric applications in the future.

2. Novelty: At present, spatial and temporal image fusion technologies use surface reflectance for applications of image fusion and land cover analysis as well. However, the present invention is proposed to predict high spatial-resolution image with TOA reflectance fused, which is the first TOA-reflectance spatiotemporal image fusion method using AOD for providing large-scale and multi-sequential atmospheric-feature information for air quality monitoring.

3. Utility and Usability: The present invention proposes the spatiotemporal image fusion method retaining atmospheric features with main ideas extremely simple and clear. Weightings are calculated by using long-wavelength images to avoid the time-consuming atmospheric correction. BEA coefficients are added as well. In the end, visible band is added for predicting the high spatial-resolution image. Such a process is highly efficient and can meet the needs of applications having high urgency in time.

To sum up, the present invention is a method of TOA-reflectance-based spatiotemporal image fusion using AOD, where high spatial-resolution images and high temporal-resolution Himawari-8 images are combined; TOA-STFM is proposed for generating image having high spatiotemporal resolution; and the present invention is applied for air quality monitoring.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of top-of-atmosphere (TOA) reflectance-based spatiotemporal image fusion using aerosol optical depth (AOD), comprising steps of
   (a) preparation,
      wherein a first high spatial-resolution image (FTR) and a first low spatial-resolution image (CTR) at a reference time TR and a second high spatial-resolution image (FT1) and a second low spatial-resolution image (CT1) at a prediction time T1 are obtained; and
      wherein land cover types are determined by green band of FTR and brightness adjustment of CT1 are processed by being related to CTR;
   (b) weightings calculation,
      wherein weightings of image fusion are calculated with long-wavelength band of CTR and FTR;
   (c) blurring-effect pretreatment,
      wherein an AOD value is obtained through a contrast method from green band of $C_{T1}$ to obtain a corresponding regression line of high spatial-resolution image; and first blurring effect adjustment (BEA) coefficients prepared to enhance blurring effect of a fused image before processing image fusion are calculated by fitting said regression line of high spatial-resolution image; and
   (d) blurring-effect posttreatment,
      wherein image fusion is processed with said weightings and said first BEA coefficients to obtain said fused image at first; and blurring effect of said fused image is then directly adjusted to obtain a TOA reflectance with second BEA coefficients calculated by fitting said regression line of high spatial-resolution image,
      wherein said fused image has a high spatial resolution and a high temporal resolution and provides large-scale information to estimate air quality.

2. The method according to claim 1,
   wherein, in step (c), said contrast method is a dispersion coefficient method (DCM).

3. The method according to claim 2,
   wherein said DCM uses a window having a specific size to calculate a standard deviation between said prediction image and said reference image, said reference image having an AOD value smaller than 0.1;
   and said initial AOD value is then obtained with said standard deviation.

4. The method according to claim 1,
   wherein, in step (c), said first BEA coefficients are obtained through the following calculation formula:

$$F(x_{w/2}, y_{w/2}, T1) = \sum_{i}^{w}\sum_{j}^{w} W_{ij} \times \left( F(x_i, y_j, TR) + \frac{S_{Fine}-1}{S_{Fused}-1} \times \right.$$
$$\left. ((C(x_i, y_j, T1) - C(x_i, y_j, TR)) - \text{Offset}_{Fused}) + \text{Offset}_{Fine} \right),$$

wherein F and C are reflectance values of said high spatial-resolution images ($F_{TR}, F_{T1}$) and said low spatial-resolution images ($C_{TR}, C_{T1}$), respectively; w is a size of a search window finding neighboring pixels having a similar spectrum; $x_{w/2}, y_{w/2}$ is a center pixel of said search window; $x_i, y_j$ is one of the neighboring pixels of the center pixel; $W_{ij}$ is the weighting of said one of said neighboring pixels; $S_{Fine}$ and $S_{Fused}$ are the slope values of said regression line of high spatial-resolution image and a regression line of said fused image, respectively; and $\text{Offset}_{Fine}$ and $\text{Offset}_{Fused}$ are offset values of said regression line of high spatial-resolution image and said regression line of said fused image, respectively.

5. The method according to claim 1,
   wherein, in step (d), said second BEA coefficients are obtained through the following calculation formula:

$$F(x_{w/2}, y_{w/2}, T1) =$$
$$\frac{S_{Fine}}{S_{Fused}} \times \left( \left( \sum_{i}^{w}\sum_{j}^{w} W_{ij} \times (F(x_i, y_j, TR) + C(x_i, y_j, T1) - C(x_i, y_j, TR)) \right) - \right.$$
$$\left. \text{Offset}_{Fused} \right) + \text{Offset}_{Fine},$$

wherein F and C are reflectance values of said high spatial-resolution images ($F_{TR}, F_{T1}$) and said low spatial-resolution images ($C_{TR}, C_{T1}$), respectively; w is a size of a search window finding neighboring pixels having a similar spectrum; $x_{w/2}, y_{w/2}$ is a center pixel of said search window; $S_{Fine}$ and $S_{Fused}$ are the slope values of said regression line of high spatial-resolution image and a regression line of said fused image, respectively; $x_1, y_j$ is one of the neighboring pixels of the center pixel; $W_{ij}$ is the weighting of said one of said neighboring pixels; and $\text{Offset}_{Fine}$ and $\text{Offset}_{Fused}$ are offset values of said regression line of high spatial-resolution image and said regression line of said fused image, respectively.

* * * * *